United States Patent [19]

Burkhardt et al.

[11] Patent Number: 4,701,490

[45] Date of Patent: Oct. 20, 1987

[54] METHOD FOR STABILIZING ORGANOPOLYSILOXANES

[75] Inventors: Jürgen Burkhardt, Winhöring; Werner Rauchberger, Burghausen, both of Fed. Rep. of Germany

[73] Assignee: Wacker-Chemie GmbH, Munich, Fed. Rep. of Germany

[21] Appl. No.: 863,277

[22] Filed: May 15, 1986

[30] Foreign Application Priority Data

Sep. 16, 1985 [DE] Fed. Rep. of Germany ....... 3533028

[51] Int. Cl.$^4$ ................................................. C07F 7/08
[52] U.S. Cl. ..................................... 524/425; 524/430; 524/432; 524/433; 525/475; 528/23; 528/485; 528/488; 528/489; 556/401
[58] Field of Search ................. 528/485, 488, 489, 23; 524/425, 430, 432, 433; 525/475; 556/401

[56] References Cited

U.S. PATENT DOCUMENTS

| | | | |
|---|---|---|---|
| 2,830,967 | 4/1958 | Nitzche et al. | 528/23 |
| 2,990,419 | 6/1961 | Nitzche et al. | 252/78.3 |
| 3,186,967 | 6/1965 | Nitzche et al. | 528/23 |
| 3,398,176 | 8/1968 | Nitzche et al. | 528/23 |
| 3,652,711 | 3/1972 | Triem et al. | 528/23 |
| 3,706,775 | 12/1972 | Nitzche et al. | 556/417 |
| 3,839,388 | 10/1974 | Nitzche et al. | 528/23 |
| 4,203,913 | 5/1980 | Burtchardt et al. | 556/401 |
| 4,460,726 | 7/1984 | Huber et al. | 528/23 |
| 4,564,693 | 1/1986 | Riederer | 556/401 |

FOREIGN PATENT DOCUMENTS 809229  3/1969 Canada.
1049188 11/1966 United Kingdom.

Primary Examiner—John C. Bleutge
Assistant Examiner—David W. Woodward

[57] ABSTRACT

A method for stablizing organopolysiloxanes containing phosphonitrilic chlorides and/or their reaction products against viscosity changes by reacting the phosphorus compounds present in the organopolysiloxanes with at least one oxide, hydroxide or carbonate of a divalent or trivalent metal, and thereafter separating the solid from the organopolysiloxanes.

6 Claims, No Drawings

METHOD FOR STABILIZING ORGANOPOLYSILOXANES

The present invention relates to stabilized organopolysiloxanes, and more particularly to a method for stabilizing organopolysiloxanes obtained from the condensation and/or equilibration of organosilicon compounds having Si-bonded oxygen in the presence of phosphonitrilic chloride catalysts.

BACKGROUND OF THE INVENTION

The viscosity of organopolysiloxanes prepared by the condensation and/or equilibration of organosilicon compound(s) having Si-bonded oxygen in the presence of phosphonitrilic chloride(s) often changes during storage when the phosphonitrilic chloride catalysts are not deactivated after the condensation and/or equilibration reaction. A method for stabilizing the viscosity of organopolysiloxanes obtained from the condensation and/or equilibration of organosilicon compounds in the presence of phosphonitrilic chlorides is described in U.S. Pat. No. 3,398,176 to Nitzsche, in which the phosphonitrilic chlorides are reacted with 1 to 1.5 equivalents of tertiary amine per equivalent of chlorine in the phosphonitrilic chloride.

Therefore, it is an object of the present invention to stabilize organopolysiloxanes which are obtained from the condensation and/or equilibration of organosilicon compounds having Si-bonded oxygen, using phosphonitrilic chlorides as the condensation- and/or equilibration-promoting catalysts. Another object of the present invention is to stabilize organopolysiloxanes against viscosity changes which are obtained from the condensation and/or equilibration of organosilicon compounds having Si-bonded oxygen in the presence of phosphonitrilic chlorides or their reaction products using a substance having a low toxicity and which is free of offensive odor. Still another object of the present invention is to provide a method for removing phosphonitrilic chlorides or their reaction products from organopolysiloxanes which are obtained from the condensation and/or equilibration of organosilicon compounds in the presence of phosphonitrilic chlorides. A further object of the present invention is to provide organopolysiloxanes which are obtained from the condensation and/or equilibration of organosilicon compounds in the presence of phosphonitrilic chlorides that are essentially free of phosphorus compounds, their reaction products and deactivation products.

SUMMARY OF THE INVENTION

The foregoing objects and others which will become apparent from the following description are accomplished in accordance with this invention, generally speaking, by providing a method for stabilizing organopolysiloxanes which are obtained from the condensation and/or equilibration of organosilicon compounds having Si-bonded oxygen atoms in the presence of phosphonitrilic chlorides, which comprises contacting the organopolysiloxanes containing the phosphorus compounds with a compound selected from the group consisting of a metal oxide, a metal hydroxide and a metal carbonate, where the metal is a divalent or trivalent metal and thereafter separating the solid which consists of the metal oxide, metal hydroxide or metal carbonate and/or the reaction product of the metal compound with the phosphorus compound in the organopolysiloxanes.

DESCRIPTION OF THE INVENTION

Organopolysiloxanes which are stabilized against viscosity changes in accordance with the present invention may be represented by the general formula

where R is hydrogen or the same or different monovalent hydrocarbon radical or substituted monovalent hydrocarbon radical, with the proviso that a hydrocarbon radical is also bonded to each silicon atom to which the hydrogen is directly bonded; A is hydrogen or a radical having the formula

where R is the same as above; R' is a monovalent hydrocarbon radical or a substituted monovalent hydrocarbon radical bonded to silicon via oxygen; a is 0, 1, 2 or 3 and m is an integer having a value of at least 4.

Although not indicated by such formulas, it is possible to replace up to 5 mol percent of the units having the formula $SiR_2O$ by other siloxane units, such as units having the formula $RSiO_{3/2}$ where R is the same as above or $SiO_{4/2}$ units or monoorganosiloxane units having $RSiO_{3/2}$ and $SiO_{4/2}$ units. These are generally present only as more or less unavoidable impurities.

Examples of monovalent hydrocarbon radicals represented by R, i.e., SiC-bonded hydrocarbon radicals in the organopolysiloxanes to be stabilized, are alkyl radicals, such as methyl, ethyl, n-propyl, isopropyl, n-butyl and sec-butyl; alkenyl radicals such as vinyl and allyl radicals; aryl radicals such as the phenyl radical; alkaryl radicals such as the toluene and xylene radicals; and aralkyl radicals such as the benzyl radical.

Examples of substituted monovalent hydrocarbon radicals represented by R, i.e., the SiC-bonded substituted hydrocarbon radicals in the organopolysiloxanes to be stabilized, are cyanoalkyl radicals, such as β-cyanoethyl, and halogenated hydrocarbon radicals, such as alkyl halide radicals, for example, 3,3,3-trifluoropropyl, and aryl halide radicals, for example, the o-, m- and p-chlorophenyls.

It is preferred that at least 50 percent of the number of SiC-bonded organic radicals in the organopolysiloxanes to be stabilized in accordance with the present invention be methyl radicals because of their availability. The remaining SiC-bonded organic radicals which are present, if any, are preferably vinyl or phenyl radicals. Furthermore, the presence of Si-bonded hydrogen can have certain advantages.

Examples of substituted and unsubstituted hydrocarbon radicals represented by R', which are bonded to silicon via oxygen are methoxy, ethoxy and methoxyethyleneoxy ($CH_3OCH_2CH_2O—$) and R group-substituted phenoxy radicals.

The viscosity of the organopolysiloxanes, which is to be stabilized against a change, in accordance with the present invention, is generally 2 to 10,000 mPa.s at 25° C.

The method of the present invention will be most important for organopolysiloxanes having the above formula in which A is hydrogen or the radicals —$SiR_3$, such as a trimethylsilyl or a dimethylvinylsilyl radical, or in which a portion of A represents hydrogen and the remaining A is the —SiR$_3$ radical.

One type of organopolysiloxane or mixtures of at least two different types of organopolysiloxanes may be stabilized by the method of this invention.

The phosphonitrilic chlorides present in the organopolysiloxanes to be stabilized against viscosity changes in accordance with the present invention, may be those prepared by reacting 400 weight parts of phosphorus pentachloride with 130 weight parts of ammonium chloride (see, for example, "Berichte der Deutschen Chemischen Gesellschaft", Volume 57 (1924), page 1345) and/or those obtained by reacting 2 moles of phosphorus pentachloride with 1 mole of ammonium chloride, such as described in U.S. Pat. No. 3,839,388 to Nitzsche et al. Phosphonitrilic chlorides prepared in accordance with the procedure described in U.S. Pat. No. 3,839,388 are preferred.

It is not known whether the organopolysiloxanes obtained by the condensation and/or equilibration of organosilicon compounds having Si-bonded oxygen using phosphonitrilic chlorides, actually contain phosphonitrilic chlorides after the condensation and/or equilibration reaction or contain, in addition to or instead of phosphonitrilic chlorides, their reaction products with, for example, the organopolysiloxanes. Therefore, the nature of these reaction products cannot be specified with any certainty. However, one should not completely exclude the possibility of the presence in the organopolysiloxanes of reaction products which have been prepared as a result of the condensation and/or equilibration of organosilicon compounds having Si-bonded oxygen in the presence of the phosphonitrilic chlorides.

The preparation of organopolysiloxanes containing phosphonitrilic chlorides, and/or their reaction products which promote organopolysiloxane condensation and/or equilibration is generally known, and is described, for example, in U.S. Pat. Nos. 2,830,967 to Nitzsche et al; 2,990,419 to Nitzsche et al; 3,186,967 to Nitzsche et al; British Pat. No. 1,049,188 to Wacker-Chemie GmbH; U.S. Pat. Nos. 3,398,176 to Nitzsche et al; 3,706,775 to Nitzsche et al; 3,652,711 to Triem et al; Canadian Pat. No. 809,229 to Wacker-Chemie GmbH; and U.S. Pat. No. 3,839,388 to Nitzsche et al, all of which are incorporated herein to form a part of the disclosure of the present invention.

In the preparation of organopolysiloxanes containing phosphonitrilic chlorides and/or their reaction products which promote organopolysiloxane condensation and/or equilibration, the phosphonitrilic chlorides are preferably employed in an amount of from about 0.001 to about 0.05 weight percent and more preferably from about 0.002 to about 0.03 weight percent, based on the total weight of organosilicon compounds employed in the condensation and/or equilibration reaction.

The preferred divalent and trivalent metals of the metal oxides, hydroxides and carbonates are magnesium, calcium, strontium, barium, zinc and aluminum. Examples of preferred metal oxides, hydroxides and carbonates are magnesium oxide, calcium oxide, zinc oxide, aluminum oxide, magnesium carbonate, calcium carbonate, strontium carbonate, barium carbonate, zinc carbonate, magnesium hydroxide, calcium hydroxide, zinc hydroxide and aluminum hydroxide.

It will be obvious that the cited oxides are not the highly calcined oxides, that is, oxides treated at temperatures above 1000° C., since such oxides are extremely low reactive materials. Also, high-temperature modified oxides, such as, for example, corundum are excluded.

A single divalent or trivalent metal oxide, hydroxide or carbonate compound may be used, as well as a mixture which contains at least two of these compounds.

The divalent or trivalent metal oxide, hydroxide and/or carbonate is used in an amount of from about 5 to 100 gram-equivalents and more preferably from about 10 to 50 gramequivalents per gram-atom of phosphorus. The method of the present invention is preferably carried out at a temperature of from about 0° C. to 200° C. and more preferably at room temperature to about 180° C. The method of the present invention may be conducted at ambient pressure, that is, for example, at 1020 hPa (absolute), or at higher or lower pressures. The method in accordance with the present invention can be carried out batchwise, or as a semi-continuous or as a continuous process.

The divalent and/or trivalent metal oxides, hydroxides and/or carbonates used in the method of the present invention react with the phosphonitrilic chlorides, or with the reaction products thereof, and adsorb the products formed by this reaction.

After the reaction, the solids, that is, the oxides, hydroxides and/or carbonates and the reaction products bound to them from their reaction with the phosphonitrilic chlorides or with the reaction products of phosphonitrilic chlorides, are separated from the organosilicon compounds by, for example, filtration or centrifugation. The organopolysiloxanes thus treated are almost completely free of phosphonitrilic chloride and its secondary products. This is illustrated by the fact that the resultant organopolysiloxanes have a low electrical conductivity.

The organopolysiloxanes containing phosphonitrilic chloride and/or its reaction products are treated with the oxides, hydroxides and/or carbonates for from about 0.5 hours to 2 days and more preferably for from 1 hour to 1 day, depending on the amount of phosphonitrilic chloride and the amount of oxides, hydroxides and/or carbonates used.

In order to ensure good mixing, it is preferred that the mixture of organopolysiloxane containing phosphonitrilic chlorides and/or their reaction products which promote organopolysiloxane condensation and/or equilibration and the divalent or trivalent metal oxides, hydroxides or carbonates be mixed in a planetary stirrer, twin-screw kneader or a gear pump.

The organopolysiloxanes stabilized in accordance with the present invention can be used for all purposes for which stabilized organopolysiloxanes have been or could have been used heretofore. For example, they may be used as thread lubricants, in the preparation of organopolysiloxane elastomers and in the preparation of antistick coatings. In addition, the stabilized organopolysiloxanes are suitable as transformer oils, electrically insulating oils and as starting materials for electrically insulating silicone rubbers, which may be used for applications in electrical engineering.

The phosphonitrilic chloride used in the following examples is prepared in the following manner:

A mixture containing 417 g (2 moles) of phosphorus pentachloride, 53.5 g (1 mole) of ammonium chloride and 1000 ml of tetrachloroethane is boiled under reflux for 12 hours. A light yellow solution is obtained from which the volatiles are removed at 160° C. while lowering the pressure to approximately 1.33 hPa (absolute). A yellow crystalline residue is obtained which consists essentially of a compound having the formula $Cl_3PNPCl_2NPCl_3 \cdot PCl_6$.

EXAMPLE 1

About 0.2 ml of a 25 weight percent solution of phosphonitrilic chloride in dichloromethane is added to 720 g of α, ω-bis(trimethylsiloxy)polymethylhydrogensiloxane having a viscosity of 25 mm²/s at 25° C. and 296 g of α, ω-bis(trimethylsiloxy)polydimethylsiloxane having a viscosity of 100 mm²/s at 25° C. After stirring for 8 hours at 80° C. and at a pressure of about 1020 hPa, the batch is divided into two equal parts. To one part (Sample A), 1 ml triisononylamine is added and then stirred for 1 hour at room temperature. To the other part (Sample B), 3 g of magnesium oxide (available from Firma Magnesium GmbH, Lueneburg) are added and then stirred for 1 hour at room temperature and then filtered.

Both samples have the same viscosity (34 mm²/s at 25° C.) and the same Si-bonded hydrogen content (1.2 percent). However, they have different volume resistivities ρ and phosphorus contents as determined by X-ray fluorescence analysis (XFA).

|  | ρ (Ω · cm) | Phosphorus Determination (XFA) |
| --- | --- | --- |
| Sample A | $5 \cdot 10^{11}$ | Positive |
| Sample B | $8 \cdot 10^{12}$ | Negative |

No phosphorus can be detected in the magnesium oxide by XFA before it is mixed with Sample (B), whereas the solids obtained after filtration of Sample (B) contain measurable amounts of phosphorus as determined by XFA.

EXAMPLE 2

About 0.15 ml of a 25 weight percent solution of phosphonitrilic chloride is added to 1000 g of α, ω-dihydroxypolydimethylsiloxane having a viscosity of 180 mm²/s at 25° C. and 125 g of α, ω-divinylpolydimethylsiloxane having a viscosity of 30 mm²/s at 25° C. After stirring for 4 hours at 80° C. and at a pressure of about 5 to 10 hPa., the batch is divided into two equal parts. To one part, 0.5 ml of trioctylamine is added and stirred for 2 hours at room temperature at 1010 hPa (Sample C). About 5 g of aluminum oxide (type: no. 115-25; available from VAW-Vereinigte Aluminium-Werke AG, Bonn) is added to the other portion of the reaction mixture and stirred for 2 hours at room temperature at 1010 hPa and then filtered (Sample D).

The two samples have the same viscosity (880 mm²/s at 25° C.) and the same content of vinyldimethylsiloxy groups (0.9 mol percent).

|  | ρ (Ω · cm) | Phosphorus Determination (XFA) |
| --- | --- | --- |
| Sample C | $6 \cdot 10^{12}$ | Positive |
| Sample D | $4 \cdot 10^{14}$ | Negative |

No phosphorus can be detected in the aluminum oxide by XFA before it is added to Sample D, whereas the solids obtained after filtration contain measurable quantities of phosphorus as determined by XFA.

What is claimed is:

1. A method for stabilizing organopolysiloxanes against viscosity changes having the general formula $AO(SiR_2O)_mA$, where R is selected from the group consisting of hydrogen, a monovalent hydrocarbon radical and a substituted monovalent hydrocarbon radical, with the proviso that a hydrocarbon radical is bonded to each silicon atom to which the hydrogen is directly bonded; A is selected from the group consisting of hydrogen and a radical having the formula $-SiR_aR'_{3-a}$, where R is the same as above; R' is selected from the group consisting of a monovalent hydrocarbon radical and a substituted monovalent hydrocarbon radical bonded to silicon via oxygen; a is 0, 1, 2 or 3 and m is an integer having a value of at least 4, said organopolysiloxanes are obtained from the condensation and/or equilibration of organosilicon compounds having Si-bonded oxygen in the presence of phosphonitrile chlorides, which comprises contacting the phosphorus compounds present in the organopolysiloxanes with a metal compound selected from the group consisting of a metal oxide, metal hydroxide and metal carbonate, where the metal is selected from the group consisting of a divalent and trivalent metal, and thereafter separating a solid containing the metal compound and phosphorous from the organopolysiloxanes.

2. The method of claim 1, wherein the metal is a divalent metal.

3. The method of claim 1, wherein the metal is a trivalent metal.

4. The method of claim 1, wherein the metal of the metal compound is selected from the group consisting of magnesium, calcium, strontium, barium, zinc and aluminum.

5. The method of claim 1, wherein the metal compound is used in an amount of from 5 to 100 gram-equivalents per gram-atom of phosphorus in the phosphonitrilic chlorides used in the preparation of the organopolysiloxanes.

6. The method of claim 4, wherein the metal compound is used in an amount of from 5 to 100 gram-equivalents per gram-atom of phosphorus in the phosphonitrilic chlorides used in the preparation of the organopolysiloxanes.

* * * * *